United States Patent
Roberts et al.

(10) Patent No.: US 8,625,998 B2
(45) Date of Patent: Jan. 7, 2014

(54) TRAFFIC DRIVEN VARIABLE BANDWIDTH OPTICAL TRANSMISSION

(75) Inventors: Kim B. Roberts, Nepean (CA); Jerome Chiabaut, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 13/220,318

(22) Filed: Aug. 29, 2011

(65) Prior Publication Data

US 2012/0219288 A1 Aug. 30, 2012

Related U.S. Application Data

(63) Continuation of application No. 10/436,129, filed on May 13, 2003, now Pat. No. 8,009,985.

(51) Int. Cl.
  *H04B 10/04* (2006.01)
(52) U.S. Cl.
  USPC .......................................................... 398/182
(58) Field of Classification Search
  USPC .......................................................... 398/182
  See application file for complete search history.

(56) References Cited

U.S. PATENT DOCUMENTS

| | | | |
|---|---|---|---|
| 5,408,498 A | 4/1995 | Yoshida | |
| 5,513,029 A | 4/1996 | Roberts | |
| 5,880,837 A | 3/1999 | Roberts | |
| 5,896,391 A | 4/1999 | Solheim et al. | |
| 5,949,560 A | 9/1999 | Roberts et al. | |
| 6,631,118 B1 * | 10/2003 | Jones | 370/252 |

* cited by examiner

*Primary Examiner* — Shi K Li
(74) *Attorney, Agent, or Firm* — Clements Bernard PLLC; Christopher L. Bernard; Lawrence A. Baratta, Jr.

(57) ABSTRACT

Link bandwidth is varied based on the subscriber traffic load. Varying the link bandwidth has the effect of varying the actual noise margin of the link (in an inverse elation), so that the noise margin will vary inversely with the traffic load. A beneficial result is that, because the noise margin is increased during "off-peak" traffic periods, rapidly varying and burst impairments can be absorbed without causing data loss. In effect, the respective probability distributions of error bursts and traffic load are separated. Data loss only becomes a significant risk when peaks in both distributions coincide. However, the probability of that event occurring is comparatively low. This enables a lower noise margin allocation during design of the link, which dramatically reduces the link cost.

19 Claims, 6 Drawing Sheets

TRAFFIC DRIVEN VARIABLE BANDWIDTH OPTICAL TRANSMISSION

CROSS-REFERENCE TO RELATED APPLICATIONS

This application is a continuation of application Ser. No. 10/436,129, filed May 13, 2003, now pending. The patent application identified above is incorporated here by reference in its entirety to provide continuity of disclosure.

MICROFICHE APPENDIX

Not Applicable.

TECHNICAL FIELD

The present invention relates to optical transmission systems, and in particular to traffic driven variable bandwidth optical transmission in an optical communications network.

BACKGROUND OF THE INVENTION

It is well known that the bandwidth of an optical communication link is limited by the noise margin required to ensure reliable communication. Typically, the noise margin, is measured in terms of a signal-to-noise ratio at the receiver end of a link. In some cases, the optical signal-to-noise ratio (OSNR) is directly measured at the receiver. In other cases, signal parameters such as the eye opening, or bit error rate (BER) detected at the receiver are used as a proxy for the signal to noise ratio. In all cases, the noise margin can be allocated to four categories of phenomena:
  Constant impairments, such as insertion losses and polarization coupling effects, which may vary between sites, or between individual pieces of equipment, but do not change with time;
  Slowly Varying impairments, such as temperature effects, polarization phenomena in buried cable arid aging, allot which have autocorrelation times of greater than one second;
  Rapidly varying impairments, which are short-term transients having autocorrelation times of between one microsecond and one second. Typical example's of rapidly varying impairments include polarization mode dispersion due to above-ground cable movement, and optical power transients; and
  Bursts with autocorrelation times of less than one microsecond.

Typically, a noise margin of between 3 dB and 10 dB will be allocated to a link of the optical network, depending on the degree of reliability required and the specific unknown or varying parameters. This allocation is "static", in the sense that it is selected based on the design of the link and its involved network equipment. In general, the allocated noise margin will be used in combination with forward error correction (FEC) to ensure that the link conveys subscriber traffic substantially without errors (e.g. BER≤$10^{-18}$).

Within the optical network backbone, Synchronous Optical Network (SONET) Synchronous Transport Signalling (STS) and/or Synchronous Data Hierarchy (SDH) signalling is used extensively, because of its high bandwidth capacity and reliability. Within such synchronous networks, symbols are conveyed through each link at a fixed rate, irrespective of the actual subscriber traffic load at any instant. In order to maintain stability and synchronisation across the network, any symbols that are not required for subscriber traffic (and control signalling) are encoded with spectrally white pseudo-random data.

As is well known in the art, subscriber traffic is highly variable, with daily, weekly and yearly patterns. For example, one-hour averages of night-time traffic may be only 10% that of mid-day traffic levels. During a given "peak busy hour", the traffic load on large backbone links tends toward a Poisson distribution. As a result, the instantaneous traffic load within a link of the optical network will frequently be significantly lower than the (noise margin limited) link bandwidth.

The difference between the actual traffic load at any instant and the link bandwidth is frequently referred to as the link "headroom". As the traffic load increases, the headroom decreases with an attendant rise in the risk of delayed or discarded packets, which is undesirable. Typically, for optical links in the network backbone, network operators provide a headroom of about a factor of four between the average "peak-busy hour" traffic load and the link bandwidth. Clearly, the provisioning of such large amounts of headroom is expensive, because it requires that the network supplier lease significantly more link bandwidth than will actually be used, on average.

A technique that reduces network costs remains highly desirable.

SUMMARY OF THE INVENTION

An aspect of the present invention provides a method of optical transmission of asynchronous subscriber traffic through a link of an optical communications network. In accordance with the invention: idle packets are inserted into the asynchronous traffic; a traffic load within the link is monitored, a new bandwidth is selected based on the monitored traffic load, information of the new bandwidth is transmitted the receiver.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and apparatus for enabling traffic driven variable bandwidth optical transmission in an optical communications system. In order to facilitate understanding of the present invention, a brief description of prior art transmission systems is provided below with reference to FIGS. 1 and 2. Embodiments of the present invention will then be described with reference to FIGS. 3-6.

Figure 1A:
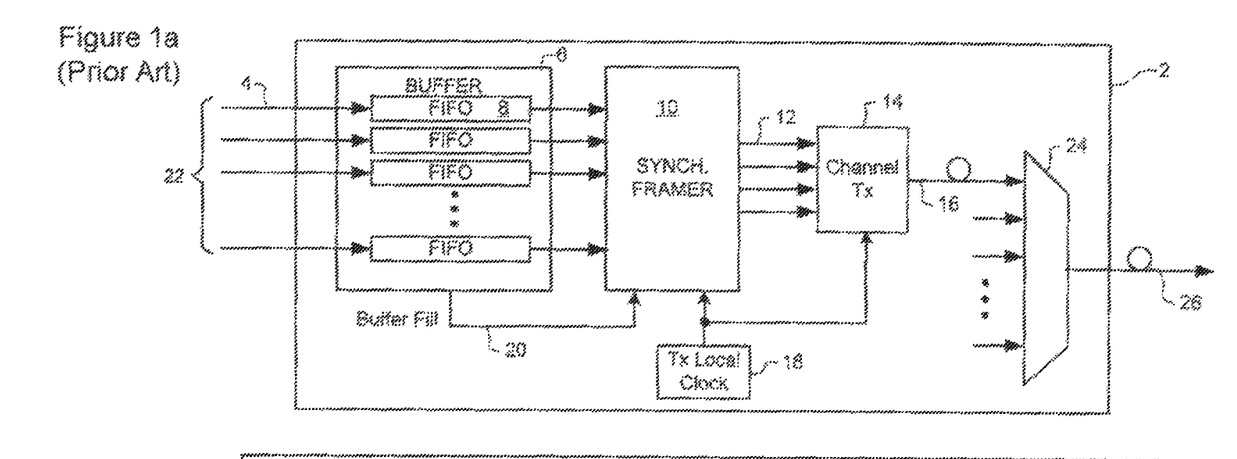
FIGS. 1a and 1b are block diagrams schematically illustrating transmitting and receiving nodes respectively, of a conventional optical communications system.

FIG. 1a is a block diagram schematically illustrating principal operations of a transmitting node 2 of an optical communications system. As shown in FIG. 1a, asynchronous subscriber signal traffic within multiple tributaries 4 is received by the node 2 and buffered in an elastic store 6. The traffic may comprise any arbitrary mix of signals, including Asynchronous Transfer Mode (ATM), Internet Protocol (IP), and Gigabit Ethernet traffic. Traffic within each tributary 4 is normally buffered in a respective First-In-First-Out (FIFO) buffer 8. A synchronising framer 10 reads data from each FIFO 8, and maps the read data into corresponding tributaries of a number of SONET Synchronous Payload Envelopes (SPEs) 12, using a format such as the Generic Framing Protocol (GFP) standard. Each SPE 12 is then passed to a channel transmitter (Tx) 14, which inserts the SPEs into an STS frame, and then modulates the STS frame onto an optical channel carrier 16 for transmission through the optical link. A Tx local clock 18, which is synchronous with a SONET Primary Reference (not shown), is used to control operation of the Synch. framer 10 and channel Tx 14.

As is known in the art, the number and size of the 12 are selected based on the channel line rate. For example, for an optical link having a channel line rate of 10 Gb/s, the synchronizing framer 10 may map subscriber data into a set of four STS-48 envelopes. Other combinations may equally be used, such as, for example, eight STS-12 envelopes.

Normally, a respective buffer fill signal 20 is generated for each tributary FIG. 8, and is used to control the insertion of idle packets into the corresponding SPE tributary. Thus, for example, if subscriber traffic is not present in any tributary 4 (as will be evidenced by an empty tributary FIFO 8), the synchronizing framer 10 will insert one or more idle packets into the corresponding SPE tributary in place of the "missing" subscriber traffic. These idle packets are typically filled with logical 1's or logical 0's, and are converted into pseudorandom data fill during conventional encoding of the STS frame for transmission.

In a Wavelength Division Multiplexed (WDM) optical communications system, the above described process of receiving and buffering subscriber traffic; mapping buffered data to SPEs 12; inserting the SPEs 12 into STS frames; and then modulating the STS frames onto an optical carrier 16 will be performed, in parallel, for each channel 22 of the system. The resulting parallel optical carrier (channel) signals 16' are then optically multiplexed (at 4) into a WDM signal 26 that is launched through the optical fiber link.

Figure 1B:
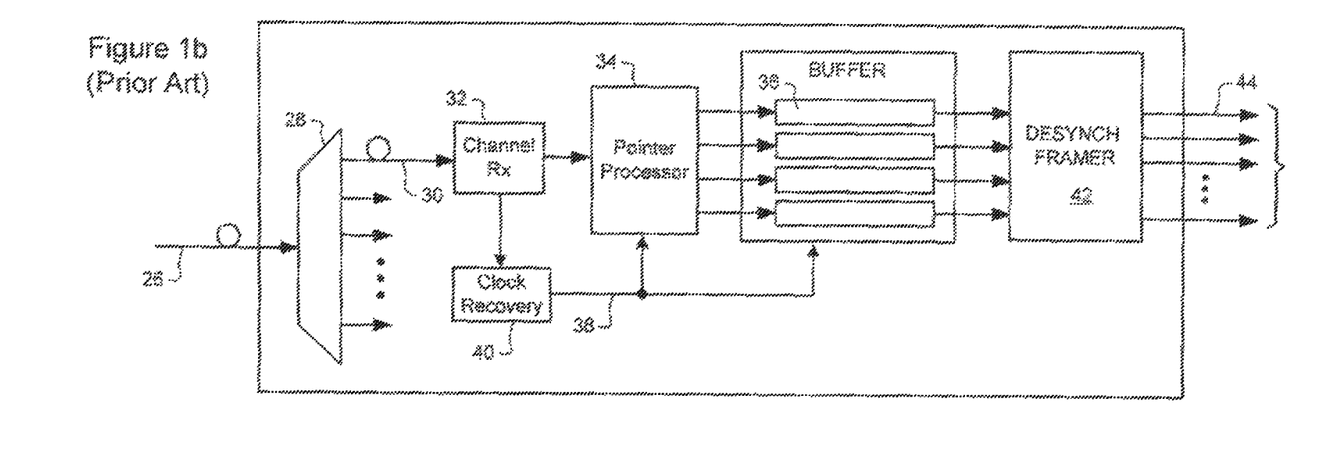

As shown in FIG. 1b, at a receiving end of the link, the above processing steps are effectively mirrored to recover the original subscriber signal traffic. Thus, an incoming WDM optical signal 26 is demultiplexed (at 28), and each channel signal 30 supplied to a respective channel receiver (Rx) 32. The channel Rx 32 detects and decodes symbols within the channel signal 30 to recover the original STS frame.

As described above, the number and size of the SPEs 12, and the size of STS frames are selected based on the line rate, which, in turn, is derived from the Tx clock 18 (and thus the SONET primary reference). The Tx clock frequency is chosen to support the given line rate that can be accommodated by the network equipment forming the link. For example, in the network backbone, most. Network equipment is designed for a bandwidth of 10 Gb/s (line rate) in each channel 22.

Figure 2A:
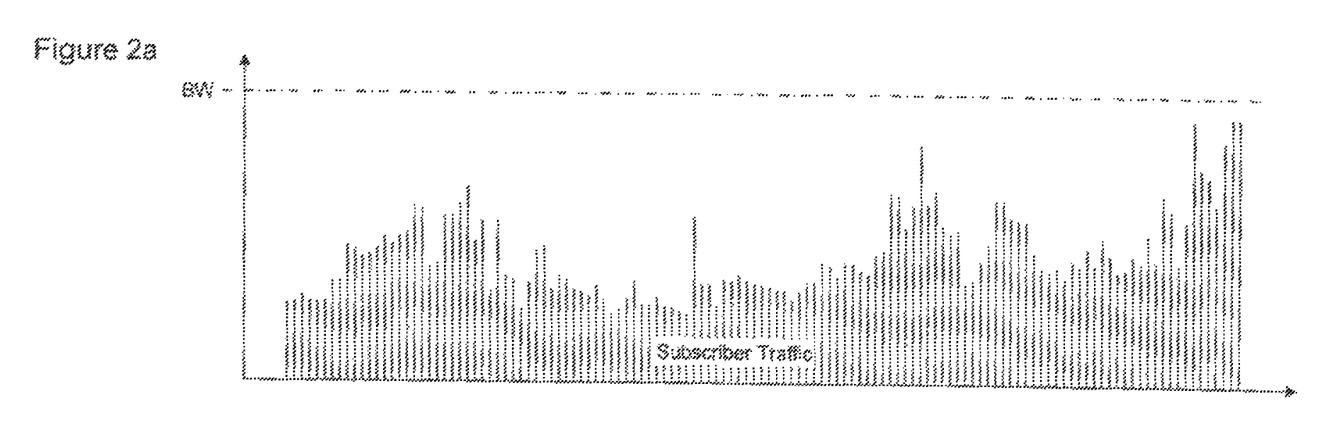
FIGS. 2a and 2b are charts showing representative subscriber traffic load and signal impairments, respectively, as a function of time.

As may be seen in FIG. 2a, the subscriber traffic load typically varies widely as a function of time. Typically, network service providers will provision network links such that the available link bandwidth (BW), or, equivalently, the total SPE payload capacity, exceeds the expected subscriber traffic load. Idle packets provide pseudorandom data fill to replace the "missing" data, in order to ensure that the SPEs (and thus the STS frame) are full. This is required in order to avoid extended "gaps" in the channel carrier 16,30 which could have the effect of destabilizing the clock recovery circuit 40 at the receiving end of the link.

Figure 2B:
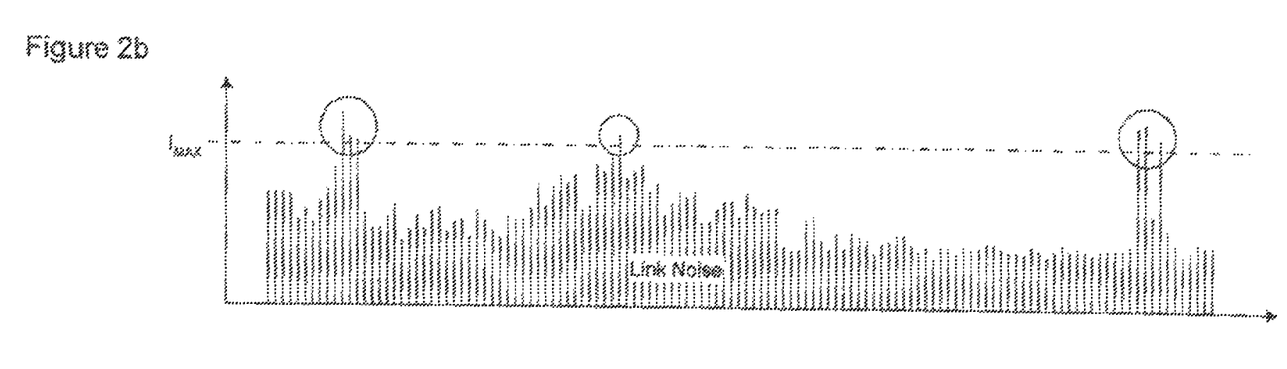

Thus it will be appreciated that the conventional link equipment operates at its design line rate at all times, independently of the actual subscriber traffic load at any particular instant. As shown in FIG. 2b, signal impairments also vary widely in time. However, because the line rate is a fixed value that is independent of subscriber traffic load, there will typically be no correlation between subscriber traffic load and signal impairments, as may be seen in FIGS. 2a and 2b. Because some signal impairments (such as self-phase modulation and cross-phase modulation) are proportional to the line rate, se of a fixed line rate means that signal impairments are maintained at a maximum level. This, in turn, implies that the communications equipment is continuously operating with a minimum noise margin consistent with satisfactory transmission reliability (e.g. $BER \leq 10^{18}$). This leaves little room for error in the allocated noise margin, so network designers must allocate a large enough amount of noise margin to allow for unexpected events. The chart of FIG. 2h shows three "error bursts n in which the signal noise in the link spikes above the maximum tolerable noise value ($I_{MAX}$) defined by the noise margin, thereby resulting in lost or severely errored bits. It should be noted that, for a given line rate and FEC encoding scheme. It will be substantially constant, as illustrated in FIG. 2h. As mentioned previously, the noise margin allocation and Fee encoding scheme are normally selected to provably reduce the probability of such "lost bit" events to an acceptable value. While this results in a noise margin allocation that is appropriate for the link bandwidth, such an allocation will normally be in excess of that which would be suggested by the actual subscriber traffic load at any particular instant.

The present invention provides a method of varying the link bandwidth based on the subscriber traffic load. Varying the link bandwidth has the effect of varying the actual noise margin of the link (in an inverse relation), so that the noise margin will vary inversely with the traffic load. A beneficial result of the present invention is that, because the noise margin is increased during "off-peak" traffic periods, rapidly varying and burst impairments can be absorbed without causing data loss. In effect, the present invention separates the respective probability distributions of error bursts and traffic load. Data loss only becomes a significant risk when peaks in both distributions coincide. However, the probability of that event occurring is comparatively low. This enables a lower noise margin allocation during design of the link, which dramatically reduces the link cost. Embodiments of the present invention are described below with reference to FIGS. 3-6.

Figure 3:
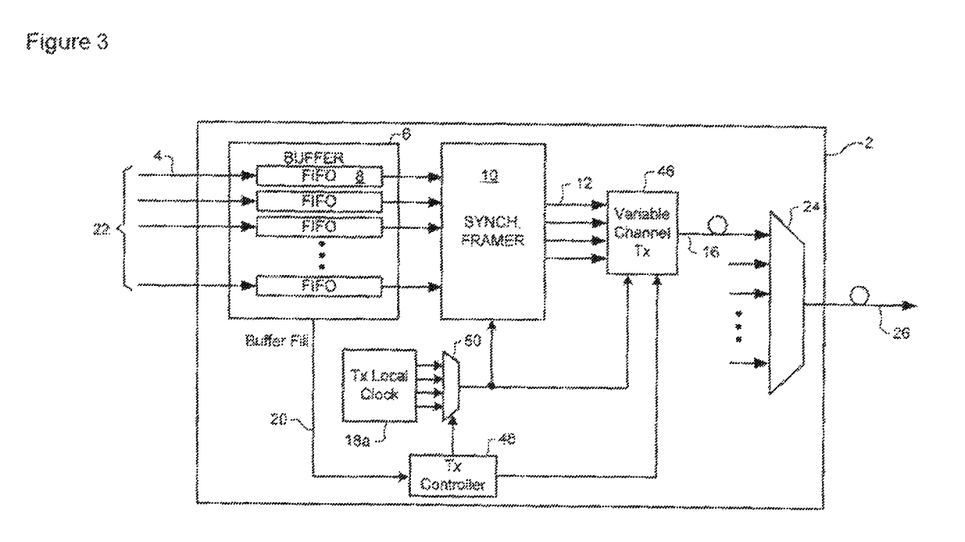
FIG. 3 is a block illustrating a transmitting node embodiment of the present invention.

FIG. 3 is a block diagram illustrating a transmitting node 2a in accordance with an embodiment of the present invention. As shown in FIG. 3, the present invention provides a variable channel transmitter (Tx) 46 controlled by a Tx controller 48. As with the conventional channel Tx 14 of FIG. 1a, the variable channel Tx 46 operates to map SPEs 12 from the synch. framer 10 into an STS frame, and then modulate the STS frame onto a respective channel optical carrier signal 16.

However, in accordance with the present invention, this functionality can be controlled to vary the bandwidth of the channel optical carrier signal 16.

In particular, the variable channel Tx 46 is designed to transmit an optical carrier signal 16 having a desired bandwidth. In the embodiment illustrated in FIG. 5a, a desired one of four different bandwidths (BW1-BW4) can be selected. These bandwidths, may, for example, correspond to OC-48, OC-96. OC-144 and OC-192 bandwidths. Various methods may be used to select an appropriate bandwidth based on the subscriber traffic load. For example, a set of threshold values (Th1-Th3) can be determined based on the objective of maintaining a predetermined minimum amount of headroom. The buffer fill 20 can then be compared to the threshold values, and the appropriate bandwidth selected based on the comparison result.

Figure 5A:
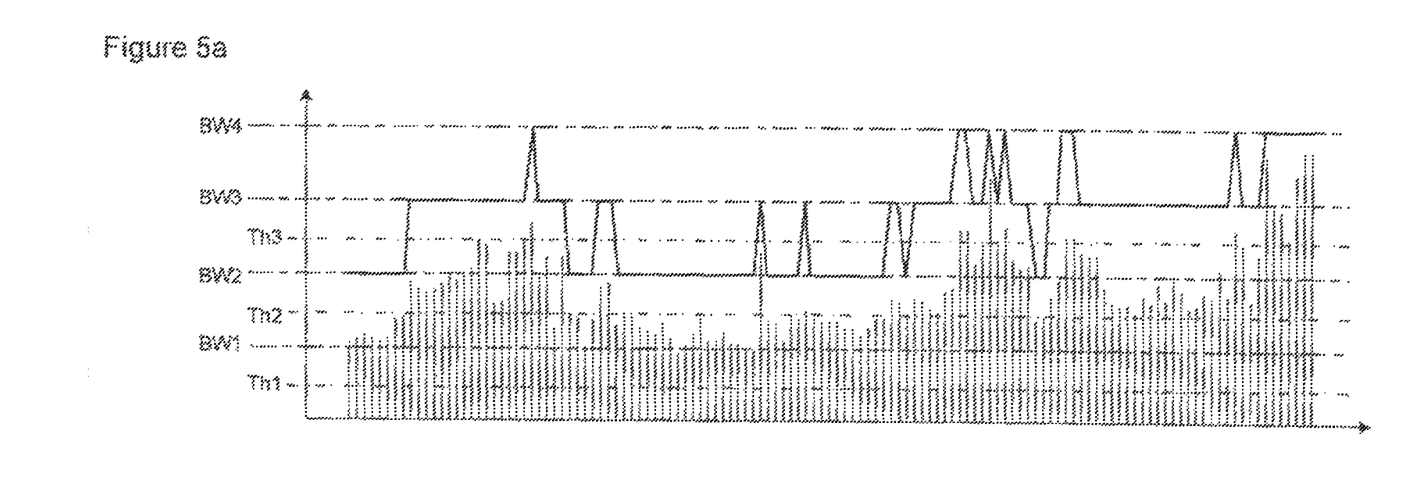
FIGS. 5a and 5b are representative subscriber traffic load and signal impairment charts showing operation of the present invention.
Figure 5B:
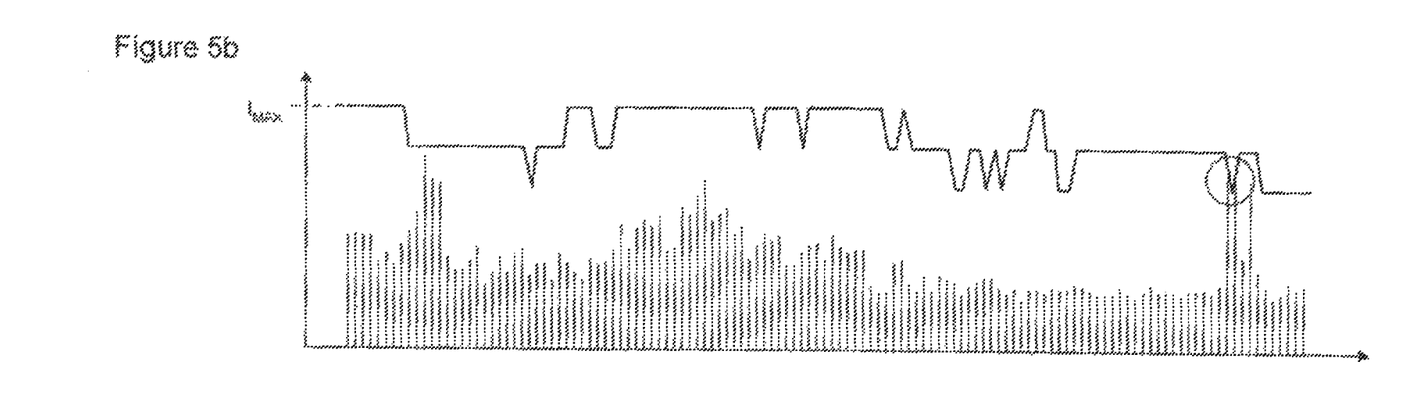

As shown in FIG. 5h, changing the bandwidth produces corresponding changes in the instantaneous noise margin, which is reflected in the maximum tolerable noise in the link ($I_{MAX}$). In particular, $I_{MAX}$ varies inversely with the line rate, as may be seen in FIG. 5h. The minimum value of $I_{MAX}$ is obtained only at the maximum line rate (BW4). Consequently, the risk of a "lost bit" event is highest only when a spike in the link noise coincides with a peak in the line rate (and thus the subscriber traffic load), because the link noise and subscriber traffic distributions are largely uncorrelated, the probability of coincident link noise spikes and traffic peaks is very low. Thus, varying the bandwidth in accordance with the present invention dramatically reduces the probability of "lost bit" events.

A further advantage of the present invention is that changes in the bandwidth are effected at the transmitting node 2a, based on the detected subscriber traffic load. Because the traffic load detection and bandwidth control functions are performed locally at the transmitting node 2a, speed of light propagation delays (about 1 mSec per 1000 km of fiber per direction) do not impose any significant limitations on the response time of the control function. Thus the present invention is capable of responding to even very short duration changes in the subscriber traffic load, and tolerate fast link changes without needing to respond.

Various methods may be used to vary the channel bandwidth, including:
  varying a line rate of the channel;
  varying a number of bits encoded within each symbol conveyed through the channel; and
  varying a ITC encoding scheme of the channel.

Each of these techniques is described in greater detail below. In each case, the buffer fill can conveniently be used as an indicator of the client traffic load.

Varying a Line Rate of the Channel

In this method, the rate at which symbols are modulated onto the channel optical carrier 16 is controlled. Varying the line rate directly controls the noise margin of the involved channel, because lower line rate signals are inherently more noise tolerant. In addition, varying the line rate on one channel indirectly alters noise margin in adjacent channels, by changing cross-channel effects such as cross-phase modulation, which are line-rate sensitive.

In general, varying the line rate involves selecting a desired Tx clock frequency, and selecting an appropriate STS frame size. In principle, this can be accomplished to a minimum granularity of an SPE-1 (i.e. 52 Mb/s). However, in practice, it may be preferable to use a larger step size. For example, in the embodiment of FIG. 3, the synch. framer 10 maps data from the tributary FIFOS 8 to a set of four SPEs 12. In order to provide a maximum bandwidth of 10 Gb/s, for example, each of the four SPEs 12 will be a concatenated STS-48 envelope. With this arrangement, a maximum of four different line rates can be accommodated, corresponding to OC-48, OC-96, OC-144 and OC-192 bandwidths, respectively. The Tx clock circuit can readily be designed to generate the required clock frequencies of 2.5 GHz, 5 GHz, 7.5 GHz and 10 GHz, respectively, in order to support each of these bandwidths. A selector, switch 50 controlled by the Tx controller 48 can then be used to select the appropriate clock frequency, so as to drive the synch. framer 10 and the variable channel Tx 46 at the desired frequency.

Figure 4:
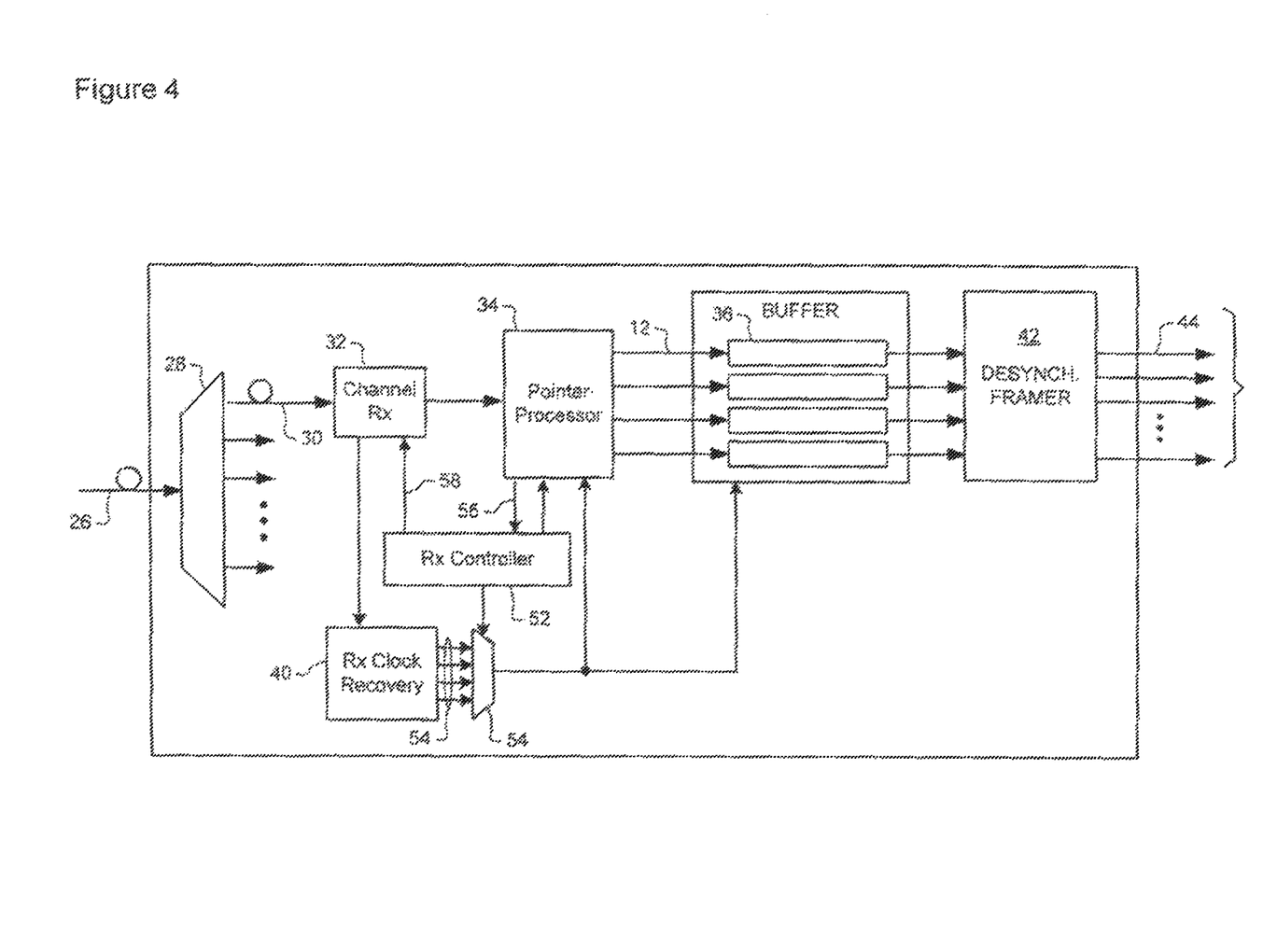
FIG. 4 is a block diagram schematically illustrating a receiving node in accordance with an embodiment of the present invention.

As shown in FIG. 4, a similar arrangement is provided at the receiving end of the link. Thus, the clock recovery circuit 40 is constructed to generate recovered clock signals having the required frequencies (in this case 2.5 GHz, 5 GHz, 7.5 GHz and 10 GHz. An Rx controller 52 can control a selector switch 54 to select the appropriate recovered clock signal, so as to drive the pointer processor 34 at the line rate of the incoming optical carrier signal 30. Because all of the recovered clock signals 38 are phase locked with the received channel optical carrier signal 30, the Rx controller 52 can switch between different Rx clock frequencies, without data loss due to loss of phase lock.

With this arrangement, the variable channel Tx 46 can transmit an optical carrier signal 16 having a desired one of four different line rates. Various methods may be used to select an appropriate line rate based on the traffic load. For example, a set of threshold values can be determined based on the objective predetermined minimum amount of headroom of maintaining a The buffer fill can then be compared to the threshold values, and the appropriate channel line rate selected based on the comparison result.

In order to prevent data loss due to mismatch between the Tx and Rx clock frequencies, the variable channel Tx 46 can be controlled to insert information identifying the line rate (or a line rate change) into the channel signal 16, for example using one or more undefined bytes of the STS frame overhead. For example, if it is desired to change the line rate, then the new line rate can be inserted into the overhead of the STS frame immediately preceding the line rate change (that is, the last frame transmitted at the old line rate). When the STS frame arrives at the receiving end of the link, the line rate (or line rate change) is detected by the pointer processor 34; and passed to the Rx controller 52 (at 56). The Rx controller 52 can, then select the appropriate recovered clock signal 38 for the next successive frame. By this means, the line rate can be varied between successive STS frames without data loss.

In the illustrated embodiment, four different line rates may be selected. As will be appreciated, a larger or smaller number of different line rates may be used.

Varying a Number of Bits Encoded within Each Symbol Conveyed Through the Channel As is known in the art, multi-level signals can be used to encode two or more bits within each symbol. For example, In U.S. Pat. No. 5,408,498, which issued to Yoshida on Apr. 18, 1995, a quaternary (i.e. four-level) signal is used to encode two bits in each symbol. In principle, this permits the channel bandwidth to be increased (in this case by a factor of two) without altering the line rate. However, it also reduces the noise margin, because accurate recovery of subscriber traffic by the channel Rx 32 requires more accurate detection of the analog level of the incoming channel optical carrier 30.

In this method, the number of bits encoded into each symbol is controlled, to thereby directly control the noise margin of the involved channel. Various methods may be used to select an appropriate number of bits-per-symbol based on the traffic load. For example, asset of threshold values can be determined based on the objective of maintaining a predetermined minimum amount of headroom. The buffer fill can then be compared to the threshold values, and the appropriate number of bits-per-symbol selected based on the comparison result.

At the receiving end of the link, correct detection and decoding of subscriber traffic requires that the channel Rx 32 be controlled to detect $2^N$ (where N is the number of bits encoded within each symbol) discrete analog levels of the inbound channel optical carrier 30. This may be accomplished by controlling the variable channel Tx 46 to insert the number (N) of encoded bits into the channel signal 16, for example using one or more undefined bytes of the STS frame overhead. For example, if it is desired to change the number of encoded bits, then the new number can be inserted into the overhead of the STS frame immediately preceding the change (that is, the last frame transmitted using the old number of encoded bits). When the STS frame arrives at the receiving end of the link, the number of encoded bits within each symbol (or the change in that number) is detected by the pointer processor 34, and passed to the Rx controller 52. The Rx controller 52 can then control the channel Rx 32 (at 58) to apply the appropriate slicing levels for detection of the next successive frame. By this means, the number of bits encoded within each symbol can be varied between successive STS frames without data loss.

Varying a FEC Encoding Scheme of the Channel

As is known in the art, it is common to allocate approximately 7% of all transmitted bits related to Forward Error Correction (FEC symptoms) If stronger FEC encoding is used, the additional bits required for FEC symptoms inherently reduces channel bandwidth (in terms of the capacity to carry subscriber traffic), but noise tolerance (and thus noise margin) increases, without any other change in the system;

In this method, the FEC encoding scheme is controlled to thereby directly control the noise margin of the involved channel. Various methods may be used to select an appropriate FEC encoding scheme based on the traffic load. For example, a set of threshold values can be determined based on the objective of maintaining a predetermined minimum amount of headroom. The buffer fill 20 can then be compared to the threshold values, and the appropriate FEC encoding scheme selected based on the comparison result.

At the receiving end of the link, correct detection and decoding of client data traffic requires that the channel Rx 32 be controlled to apply the appropriate Fee decoding scheme to the inbound channel optical carrier. This may be accomplished by controlling the variable channel Tx 46 to insert information identifying the desired EC encoding scheme into one or more undefined bytes of the TS frame overhead. For example, if it is desired to change the FEC encoding scheme, then information identifying the new scheme can be inserted into the overhead of the STS frame immediately preceding the change (that is, the last frame transmitted using the old FEC encoding scheme). When the STS frame arrives at the receiving end of the link, the FEC scheme identifier is extracted by the pointer processor 34, and passed to the Rx controller. The Rx controller can then control the channel Rx 32 to apply the appropriate FEC encoding scheme to the next successive frame. By this means, the FEC encoding scheme can be varied between successive STS frames without data loss.

The embodiments and methods described above are designed to control the noise margin of a channel by varying the bandwidth of that same channel. Clearly, these techniques can be independently implemented, alone or in combination, for each channel of a WDM optical communications system.

As is well known in the art, WDM system suffer impairments due to cross-channel effects. Consequently, a change in the bandwidth of one channel will affect the noise margin in an adjacent channel. This phenomenon was described above as one of the effects of changing the line rate of a channel. However, additional bandwidth control methods may be implemented to exploit cross-channel effects, and thereby adjust noise margin in adjacent channels. These methods are described below with reference to FIG. 6.

Figure 6:
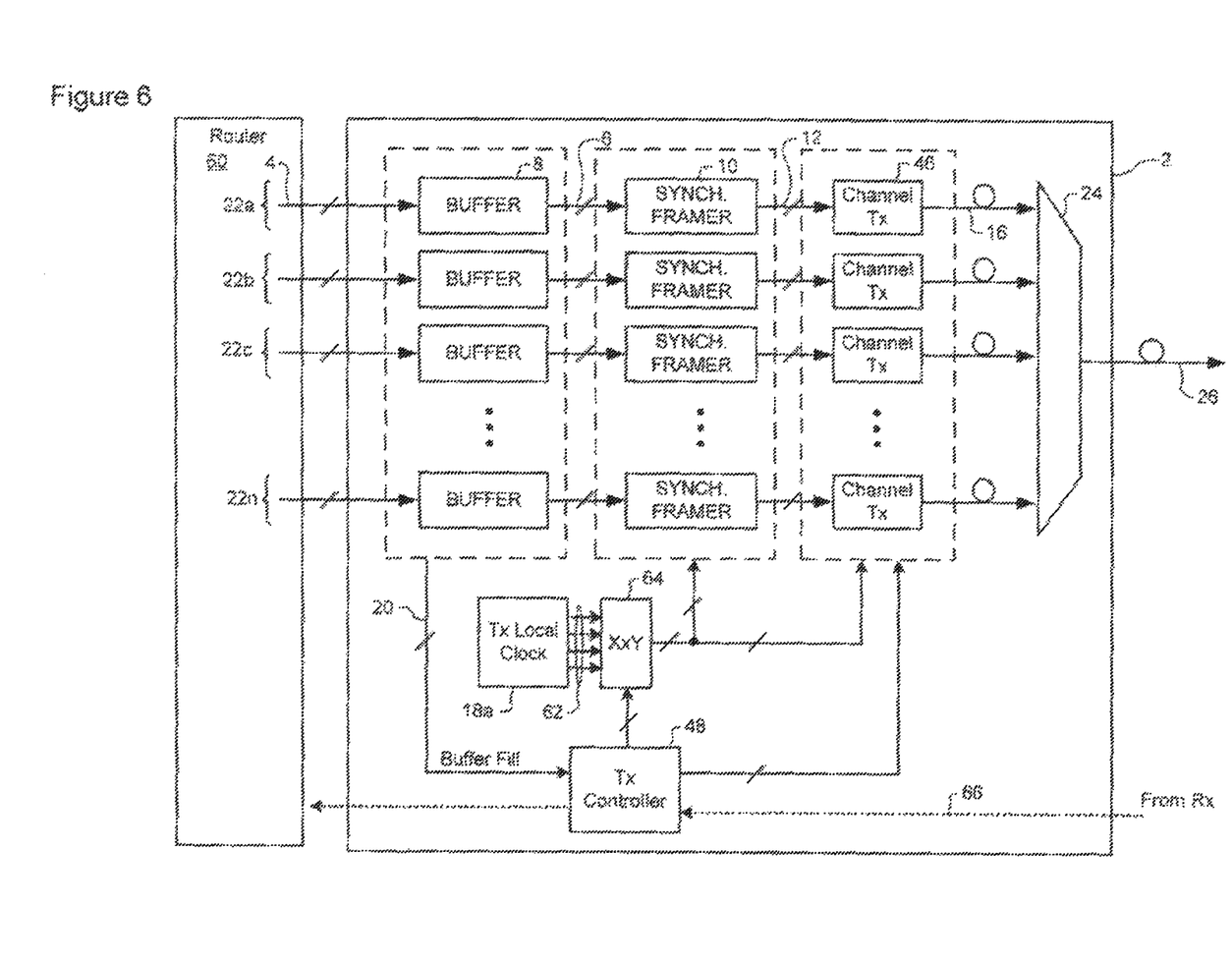
FIG. 6 is a block diagram schematically illustrating a transmitting node in accordance with a second embodiment of the present invention.

FIG. 6 is a block diagram schematically illustrating an embodiment of the invention in which bandwidth control can be implemented across multiple channels of a WDM communications system. As shown in FIG. 6 each channel 22 is provided with an independent buffer 6, synch. framer 10 and variable channel Tx 46, which operates substantially as described above with respect to FIG. 3. Thus, each channel 22 includes a buffer 6 for receiving subscriber traffic through a respective set of tributaries 4 from a conventional network router 60. The synch. framer 10 reads the buffered data and maps the read data into a set of SPEs 12. The variable channel Tx 46 inserts the SPEs into STS frames and modulates the frames onto a respective channel optical carrier 16.

Operation of each channel 22 is controlled by a shared Tx controller unit 48, which receives a respective buffer fill signal 20 for each channel 22, and determines (and controls) the bandwidth of each channel 22.

In conventional WDM systems, a shared Tx clock 18 is used to drive, all of the channels, at least across a single shelf of the node. In the embodiment of FIG. 6, the Tx Clock 18a is designed to generate multiple clock signals 62, as described above with reference to FIG. 3. A switch array 64 enables each clock signal 62 to be supplied to any desired channel synch. framer 10 and Tx 46. By this means, the line rate of each channel 22 can be individually controlled.

As may be appreciated, the embodiment of FIG. 6 is capable of implementing all of the methods described above with reference to FIGS. 3-5. Additional "cross-channel" methods which can be implemented using the embodiment of FIG. 6 include:

varying a channel optical power level;
varying a number of channels; and
varying a channel spacing.

Each of these techniques is described in greater detail below. As in the "single channel" embodiments described above with reference to FIGS. 3-5, the buffer fill can conveniently be used as an indicator of the client traffic load.

Varying a Channel Optical Power Level

In this method, the optical power level of each channel is controlled, based on either the traffic load within the respective channel, or the current bandwidth of that channel. As will be appreciated, reducing the optical power within a channel will tend to degrade the noise margin of that channel. However, this can be offset by noise margin improvements obtained by bandwidth reductions implemented in accordance with any of the other methods described herein. Thus as the traffic load (or channel bandwidth) is reduced, the transmit optical power level can also be reduced.

A primary advantage of varying the optical power level of each channel is that cross-phase modulation, four-wave mixing and Raman scattering effects are all proportional to the optical power level. Thus a reduction in the optical power level of any channel reduces impairments suffered by adjacent channels within the link.

As may be appreciated, advantages of optical power control may be limited by the presence of certain optical equipment within a link. For example, optical channel equalizers are sometimes used to minimize optical power variations between adjacent channels. Clearly, such an operation would tend to destroy the benefits of implementing individual per-channel power control. However, where client traffic is evenly distributed across all of the channels, similar bandwidth reductions are likely to be implemented within each channel. In this case, the power level of all of the channels may be controlled together, in accordance with the total traffic load through the link. With this arrangement, the presence of optical channel equalizers within the link will not adversely impact the benefits of this method.

Varying a Number of Channels

In this method, the number of channels 22 multiplexed into the link is varied. As may be appreciated, disabling a channel 22 has the effect of eliminating impairments suffered by adjacent channels, due to cross-channel effects within the link. This approach can be considered to be an extreme example of per-channel power reduction, in which the optical power of one or more channels is reduced to zero. In order to prevent loss of data, the controller can notify the router 60 to direct client traffic to only those channels that are currently active.

Varying a Channel Spacing

As described above, varying the number of channels multiplexed within the link increases the noise margin of the remaining (active) channels, by eliminating cross channel impairments from the disabled channel(s). Further improvements in the noise margin of the active channels can be improved by suitable selection of the channels to be disabled. In particular, by disabling alternate channels, the spacing between the active channels will be increased. This increased channel spacing reduces cross-channel effects between the active channels.

The present invention pros ides methods and apparatus for controlling link bandwidth based on the traffic load. The link bandwidth is controlled in response to changes in the buffer fill 20, and bandwidth changes can be implemented on a per STS frame basis. Thus the bandwidth can be updated every 125 μSec.

In the above description, link (or channel) bandwidth is controlled based on traffic load. If desired, an additional level of bandwidth control can be implemented, based on measured noise margin at the receiving end of the link. Thus, for example, known methods can be implemented at the Channel Rx 32 to measure the noise margin. The noise margin may be measured directly, or a signal quality parameter such as Optical Signal to Noise Ratio OSNR, eye opening, or bit error rate may be used as a proxy. In either case, the measured noise margin is then transmitted to the Tx controller 48, as shown at 66 in FIG. 6. Upon receipt of the noise margin measurement, the Tx controller 48 can calculate a maximum permissible link bandwidth. This value can then be used as an upper limit for the traffic-driven bandwidth.

For example, during a slowly varying ent such as a temperature effect, the Tx controller 48 will use the corresponding degraded noise margin measurements to calculate the maximum permissible link bandwidth. Referring hack to FIG. 5*a*, the calculated maximum permissible link bandwidth may be lower than the highest "design" bandwidth BW4. Traffic load within the link may drive the actual (operating) link bandwidth below this level (i.e. to any of BW1-BW3), but it can not drive the bandwidth higher (i.e. to BW4).

Because this technique requires that the noise margin measurement be transmitted from the receiving node back to the transmitting node, the speed of the control loop is subject to speed-of-light propagation delays. As a result, the responsiveness of this level of bandwidth control will be limited by the link length. For most links in the optical network backbone, the response time will normally be fast enough to track slowly varying impairments. The probability of rapidly varying and burst impairments coinciding with peak traffic loads is expected to be comparatively low. Accordingly, this technique allows a further reduction in the noise margin allocation used for calculating link headroom. This, in turn further reduces network costs, by allowing network providers to provision less bandwidth capacity for a given amount of subscriber traffic.

The embodiment (s) of the invention described above is (are) intended to be exemplary only. The scope of the invention is therefore intended to be limited solely by the scope of the appended claims.

We claim:

1. A method of optical transmission of asynchronous subscriber traffic through a link of an optical communications network, comprising steps of:
   inserting idle packets in the asynchronous subscriber traffic at a link bandwidth;
   monitoring a channel traffic load of the asynchronous subscriber traffic;
   selecting a new bandwidth of the link in response to the monitored channel traffic load;
   transmitting information indicative of the new bandwidth through the link to the receiver; and
   controlling a variable channel transmitter to transmit the asynchronous subscriber traffic in accordance with the selected new bandwidth.

2. A method as claimed in claim 1, wherein the step of monitoring the channel traffic load comprises a step of monitoring a fill of a respective channel buffer of the transmitter.

3. A method as claimed in claim 2, wherein the step of selecting the new bandwidth of the link comprises steps of:
   comparing the monitored buffer fill to a predetermined threshold value; and
   selecting a desired channel bandwidth based on the comparison result.

4. A method as claimed in claim 3, wherein the step of selecting the desired channel bandwidth comprises at least one of:
   varying a transmit optical power of a channel in the link; and
   temporarily disabling the channel.

5. A method as claimed in claim 4, wherein the step of transmitting information indicative of the new bandwidth to the receiver comprises inserting the information into an overhead of an optical signal.

6. A method as claimed in claim 3, wherein the step of selecting the desired channel bandwidth comprises selecting a desired line rate of an optical channel in the link.

7. A method as claimed in claim 6, wherein the step of controlling the variable channel transmitter comprises:
   selecting a payload envelope size in accordance with the desired line rate;
   selecting a transmit clock of the transmitter in accordance with the selected payload envelope size; and
   controlling the variable channel transmitter to transmit the optical signal through the optical channel using the selected payload envelope size and the selected transmit clock.

8. A method as claimed in claim 7, wherein the information indicative of the new bandwidth comprises an indication of the selected line rate.

9. A method as claimed in claim 3, wherein the step of selecting the desired channel bandwidth comprises selecting a desired number of bits encoded within each symbol conveyed through an optical channel of the link.

10. A method as claimed in claim 9, wherein the information indicative of the new bandwidth comprises an indication of the selected number of bits encoded within each symbol.

11. A method as claimed in claim 9, wherein the step of controlling the variable channel transmitter comprises controlling the variable channel transmitter to:
   encode the optical signal into symbols having the desired number of bits; and
   modulate the symbols onto an optical channel carrier for transmission through the link.

12. A method as claimed in claim 3, wherein the step of selecting the desired channel bandwidth comprises selecting a desired FEC encoding scheme of a channel of the link.

13. A method as claimed in claim 12, wherein the information indicative of the new bandwidth comprises an indication of the selected number of bits encoded within each symbol.

14. A method as claimed in claim 12, wherein the step of controlling the variable channel transmitter comprises controlling a FEC encoder of the variable channel transmitter to encode an optical channel signal using the selected FEC encoding scheme.

15. A method as claimed in claim 1 further comprising, at a receiver receiving an optical signal through an optical channel of the link from the variable channel transmitter, steps of:
   receiving information indicative of a new bandwidth of the optical channel from the variable channel transmitter; and
   controlling the receiver to thereafter receive the optical signal in accordance with the new bandwidth.

16. A method as claimed in claim 15, wherein the step of receiving the information indicative of the new bandwidth from the variable channel transmitter comprises extracting the information from an overhead of the optical signal received through the link.

17. A method as claimed in claim 15, wherein the information indicative of the new bandwidth comprises an indication of a line rate, and wherein the step of controlling the receiver comprises selecting a receive clock of the receiver in accordance with the indicated line rate for reception of a subsequent frame of the optical signal.

18. A method as claimed in claim 15, wherein the information indicative of the new bandwidth comprises an indication of a FEC encoding scheme, and wherein the step of controlling the receiver comprises selecting a FEC decoding scheme in accordance with the indicated FEC encoding scheme for decoding a subsequent frame of the optical signal.

19. A method as claimed in claim 15, wherein the information indicative of the new bandwidth comprises an indication of a number of bits encoded within each symbol, and wherein the step of controlling the receiver comprises controlling a channel receiver to apply slicing levels for detection of a subsequent frame of the optical signal, in accordance with the selected number of bits encoded within each symbol.

* * * * *